United States Patent
Iizuka et al.

(10) Patent No.: US 9,705,596 B2
(45) Date of Patent: Jul. 11, 2017

(54) OPTICAL COMMUNICATION APPARATUS, WAVELENGTH BAND ESTIMATING APPARATUS, OPTICAL COMMUNICATION METHOD AND STORAGE MEDIUM

(71) Applicant: CASIO COMPUTER CO., LTD., Shibuya-ku, Tokyo (JP)

(72) Inventors: Nobuo Iizuka, Hamura (JP); Masaaki Kikuchi, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 14/975,379

(22) Filed: Dec. 18, 2015

(65) Prior Publication Data

US 2016/0218805 A1    Jul. 28, 2016

(30) Foreign Application Priority Data

Jan. 28, 2015    (JP) ................. 2015-014836

(51) Int. Cl.
    *H04B 10/116*    (2013.01)
    *H04B 10/60*    (2013.01)

(52) U.S. Cl.
    CPC ........... *H04B 10/116* (2013.01); *H04B 10/60* (2013.01)

(58) Field of Classification Search
    CPC ..... H04B 10/116; H04B 10/675; H04B 10/60
    USPC ....................................... 398/172
    See application file for complete search history.

(56) References Cited

U.S. PATENT DOCUMENTS

| 8,886,054 B2 | 11/2014 | Iizuka et al. |
| 9,008,520 B2 | 4/2015 | Yokoi |
| 2009/0226185 A1 | 9/2009 | Karstens |
| 2010/0034540 A1 | 2/2010 | Togashi |
| 2011/0200338 A1 | 8/2011 | Yokoi |
| 2012/0328302 A1 | 12/2012 | Iizuka et al. |
| 2014/0193162 A1 | 7/2014 | Iizuka et al. |
| 2015/0023673 A1 | 1/2015 | Iizuka et al. |

FOREIGN PATENT DOCUMENTS

| EP | 2136484 A1 | 12/2009 |
| JP | 2010098574 A | 4/2010 |
| JP | 2013009074 A | 1/2013 |
| JP | 2014168137 A | 9/2014 |

OTHER PUBLICATIONS

Extended European Search Report dated Jul. 1, 2016, issued in counterpart European Application No. 15200759.7.
Japanese Office Action (and English translation thereof) dated Sep. 13, 2016, issued in counterpart Japanese Application No. 2015-014836.

*Primary Examiner* — Leslie Pascal
(74) *Attorney, Agent, or Firm* — Holtz, Holtz & Volek PC

(57) ABSTRACT

An optical communication apparatus includes a light receiving unit, a wavelength band determining unit and an estimating unit. The light receiving unit receives light which changes to predetermined wavelength bands in a predetermined cycle according to communication object information, for a predetermined light reception period. The wavelength band determining unit determines each wavelength band of the light received by the light receiving unit. The estimating unit estimates that a wavelength band of the light received by the light receiving unit is any one of the predetermined wavelength bands, in a case where said wavelength band determined by the wavelength band determining unit is not any one of the predetermined wavelength bands.

16 Claims, 10 Drawing Sheets

| PREVIOUS CONFIRMED COLOR / CURRENT DETERMINED COLOR | RED | GREEN | BLUE | THE OTHERS |
|---|---|---|---|---|
| YELLOW | GREEN | RED | INESTIMABLE | INESTIMABLE |
| MAGENTA | BLUE | INESTIMABLE | RED | INESTIMABLE |
| CYAN | INESTIMABLE | BLUE | GREEN | INESTIMABLE |

FIG. 9

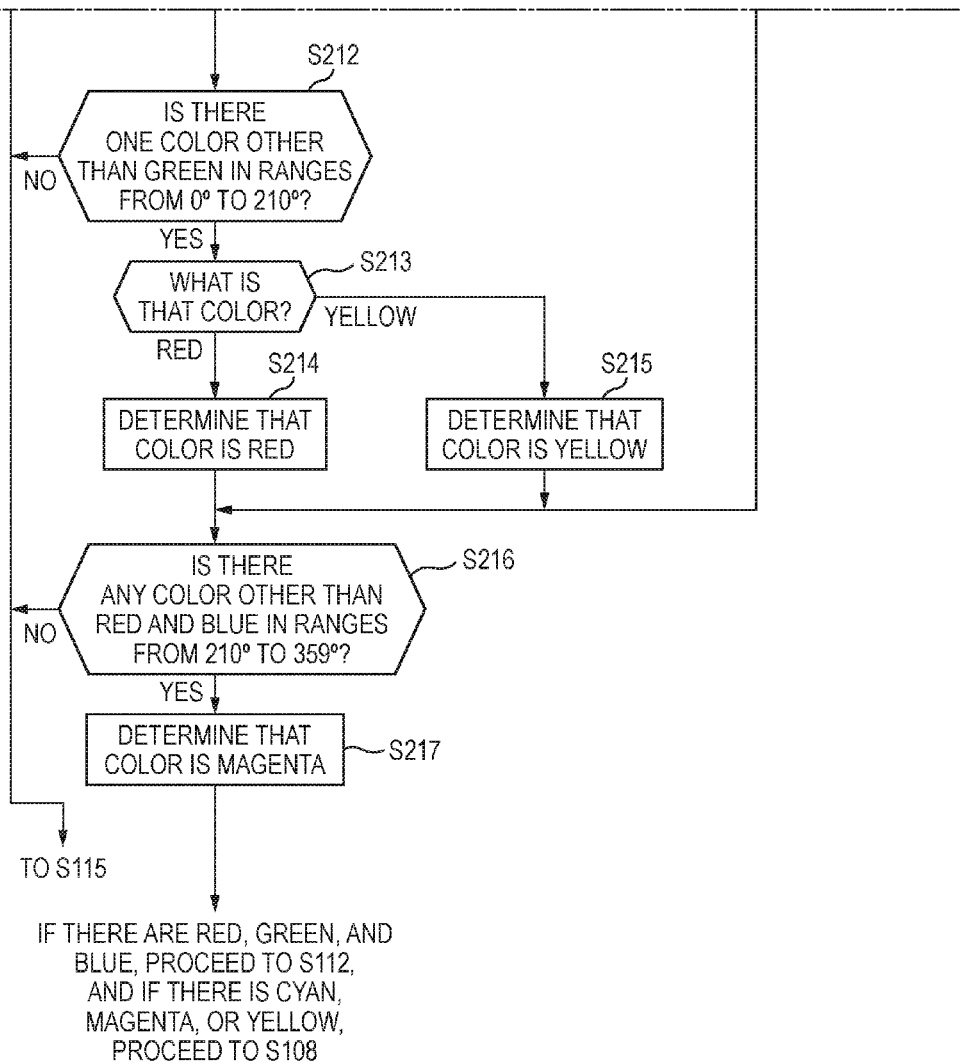

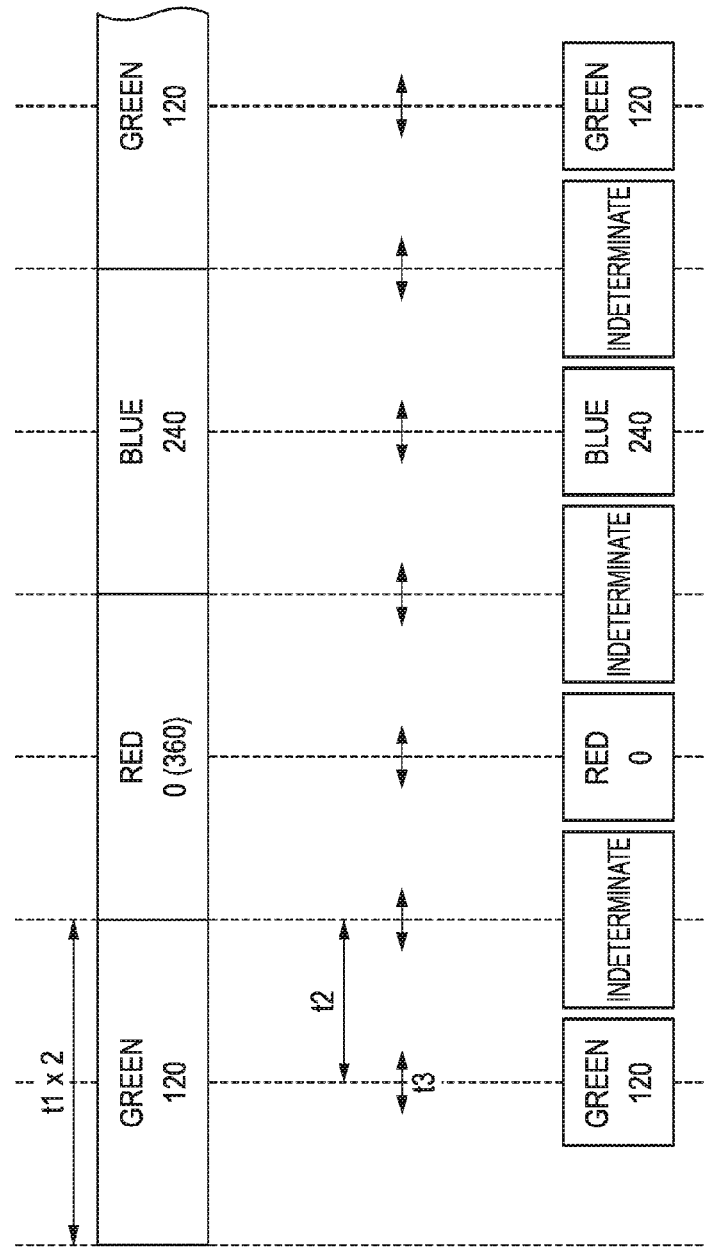

OPTICAL COMMUNICATION APPARATUS, WAVELENGTH BAND ESTIMATING APPARATUS, OPTICAL COMMUNICATION METHOD AND STORAGE MEDIUM

CROSS-REFERENCE TO RELATED APPLICATION

This application is based upon and claims the benefit of priority from the prior Japanese Patent Application No. 2015-014836, filed on Jan. 28, 2015, and the entire contents of which are incorporated herein by reference.

BACKGROUND OF THE INVENTION

1. Field of the Invention

The present invention relates to an optical communication apparatus, a wavelength band estimating apparatus, an optical communication method and a storage medium.

2. Description of the Related Art

There is an optical communication system in which the transmission side emits lights having colors (wavelength bands) according to communication object information and the reception side receives the lights and decodes the lights into the information as described in JP-A-2014-168137.

In this optical communication system, in a case where the phase of the transmission side is not in sync with the phase of the reception side, in order to implement stable optical communication, the transmission side is required to secure a period which is twice a light reception cycle of the reception side, as a light wavelength band change cycle.

For example, the transmission side should secure a period which is twice a light reception cycle tb of the reception side, as the change cycle to of each of lights having red (R), green (G), and blue (B) which are basic colors.

SUMMARY OF THE INVENTION

According to a first aspect of the present invention, an optical communication apparatus includes a light receiving unit, a wavelength band determining unit and an estimating unit. The light receiving unit receives light which changes to predetermined wavelength bands in a predetermined cycle according to communication object information, for a predetermined light reception period. The wavelength band determining unit determines each wavelength band of the light received by the light receiving unit. The estimating unit estimates that a wavelength band of the light received by the light receiving unit is any one of the predetermined wavelength bands, in a case where said wavelength band determined by the wavelength band determining unit is not any one of the predetermined wavelength bands.

According to a second aspect of the present invention, a wavelength band estimating apparatus includes a wavelength band determining unit and an estimating unit. The wavelength band determining unit determines each wavelength band of light received for a predetermined light reception period. The estimating unit estimates that a wavelength band of the received light is any one of predetermined wavelength bands, in a case where said wavelength band determined by the wavelength band determining unit is not any one of the predetermined wavelength bands.

According to a third aspect of the present invention, an optical communication method includes: receiving light which changes to predetermined wavelength bands in a predetermined cycle according to communication object information, for a predetermined light reception period; determining each wavelength band of the received light; and estimating that a wavelength band of the received light is any one of the predetermined wavelength bands, in a case where said determined wavelength band is not any one of the predetermined wavelength bands.

According to a fourth aspect of the present invention, a non-transitory computer-readable storage medium storing a program for controlling a computer to perform following processes includes: receiving light which changes to predetermined wavelength bands in a predetermined cycle according to communication object information, for a predetermined light reception period; determining each wavelength band of the received light; and estimating that a wavelength band of the received light is any one of the predetermined wavelength bands, in a case where said determined wavelength band is not any one of the predetermined wavelength bands.

BRIEF DESCRIPTION OF THE DRAWINGS

FIG. 9 is a view illustrating an example of a color estimation table.

FIGS. 11A, 11B and 11C are views illustrating an example of a transmission/reception timing chart of the related art.

DESCRIPTION OF THE PREFERRED EMBODIMENT

First Embodiment

Figure 1:
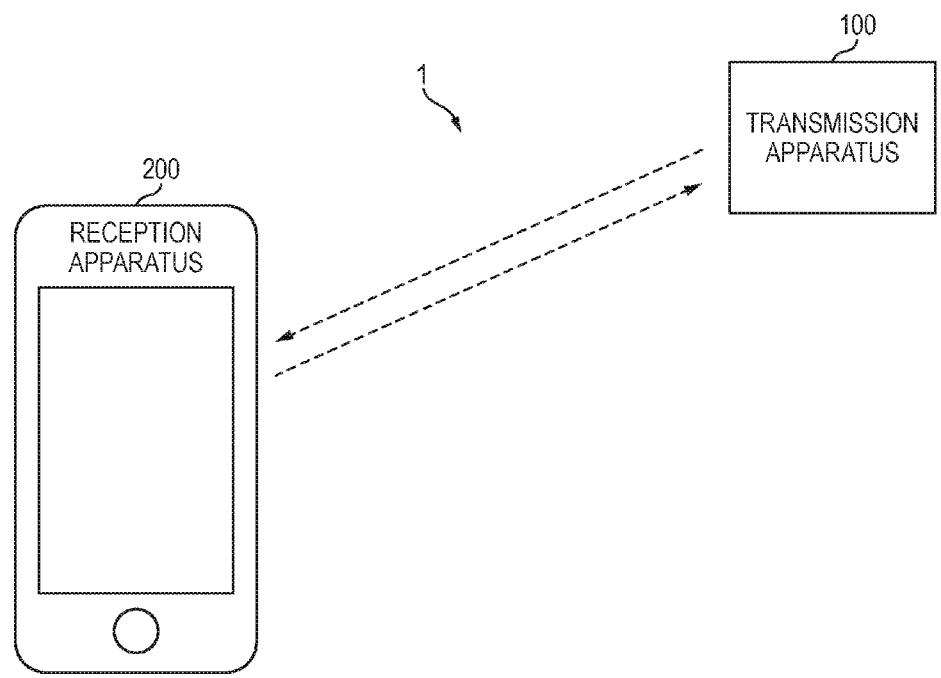
FIG. 1 is a view illustrating the configuration of an optical communication system according to an embodiment of the present invention.

Hereinafter, an optical communication system according to an embodiment of the present invention will be described. An optical communication system 1 according to a first embodiment of the present invention is configured so as to include a transmission apparatus 100 and a reception apparatus 200 as shown in FIG. 1.

In the optical communication system 1, the transmission apparatus 100 and the reception apparatus 200 are configured such that it is possible to perform communication from the transmission apparatus 100 to the reception apparatus 200 using lights as communication media.

The transmission apparatus 100 performs modulation on communication object information for the reception apparatus 200, thereby converting the corresponding information into a light signal in which red (R), green (G), and blue (B) lights which are visible lights change in time series, and outputs the light signal.

The reception apparatus 200 is, for example, a smart phone, and images the transmission apparatus 100 included in an imaging range, thereby receiving the light signal from the transmission apparatus 100. Also, the reception apparatus 200 displays an image acquired by imaging. Further, the reception apparatus 200 decodes the received light signal into the communication object information, and displays the communication object information.

Figure 2:
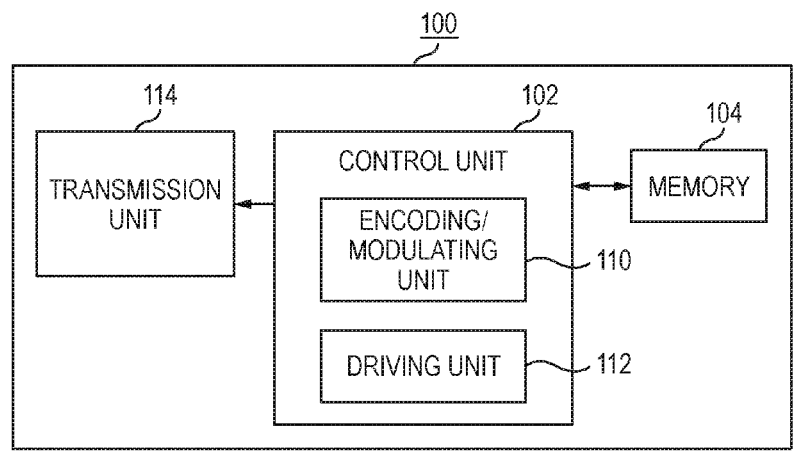
FIG. 2 is a view illustrating the configuration of a transmission apparatus shown in FIG. 1.

Now, the transmission apparatus 100 will be described. The transmission apparatus 100 is configured so as to include a control unit 102, a memory 104, and a transmission unit 114 as shown in FIG. 2.

The control unit 102 includes a central processing unit (CPU), and serves to perform software processing according to programs stored in the memory 104, thereby implementing various functions of the transmission apparatus 100.

The memory 104 includes, for example, a random access memory (RAM) which serves as a work area, and a read only memory (ROM) which stores basic operation programs. The memory 104 stores a variety of information (such as programs) which can be used for controlling and the like in the transmission apparatus 100.

The control unit 102 includes an encoding/modulating unit 110 which encodes information which is a communication object into a bit data stream. Further, the encoding/modulating unit 110 performs digital modulation based on the bit data stream. As a modulation scheme, for example, 4-ary pulse position modulation (4 PPM) using carrier waves having a frequency of 28.8 (kHz) can be used. The control unit 102 further includes a driving unit 112, which performs control based on a signal generated by the encoding/modulating unit 110 such that the transmission unit 114 changes red (R), green (G), and blue (B) lights which are visible lights having different wavelength bands in a change cycle t1 over time.

The transmission unit 114 is, for example, light emitting diodes (LEDs), and is controlled by the driving unit 112 such that it outputs while changing lights of the wavelength bands of red (R), green (G), and blue (B) in the change cycle t1.

Figure 3:
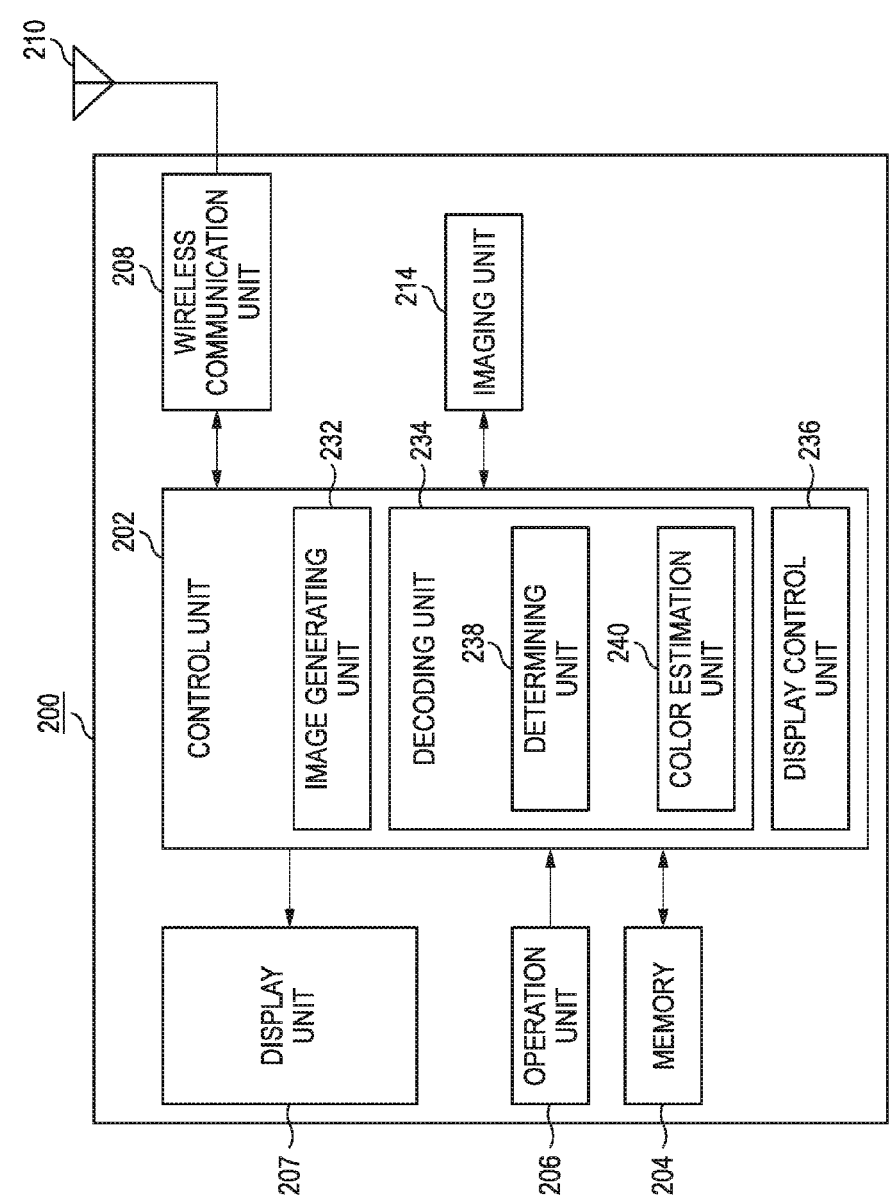
FIG. 3 is a view illustrating the configuration of a reception apparatus shown in FIG. 1.

Now, the reception apparatus 200 will be described. The reception apparatus 200 displays taken images, and serves as a communication device for receiving information from the transmission apparatus 100. The reception apparatus 200 is configured so as to include a control unit 202, a memory 204, an operation unit 206, a display unit 207, a wireless communication unit 208, an antenna 210, and an imaging unit 214 as shown in FIG. 3.

The control unit 202 is composed of a CPU. The control unit 202 serves to perform software processing according to programs stored in the memory 204, thereby implementing various functions of the reception apparatus 200.

The memory 204 includes, for example, a RAM and a ROM. The memory 204 stores a variety of information (such as programs) which can be used for controlling and the like in the reception apparatus 200.

The operation unit 206 is a touch panel which is disposed on the top surface of a display area of the display unit 207, and is an interface which can be used for inputting the content of a user's operation. The display unit 207 is composed of, for example, a liquid crystal display (LCD), a plasma display panel (PDP), or an electro-luminescence (EL) display, and displays images.

The wireless communication unit 208 is configured using, for example, a radio frequency (RF) circuit and a base band (BB) circuit. The wireless communication unit 208 performs transmission and reception of wireless signals through the antenna 210. Also, the wireless communication unit 208 modulates transmission signals and demodulates reception signals.

The imaging unit 214 is disposed on the opposite surface of the housing of the reception apparatus 200 to the surface where the display unit 207 is installed. The imaging unit 214 is composed of a lens and a light receiving element. The lens is composed of a zoom lens, and moves according to zoom control and focusing control of the control unit 202. The angle of imaging view and optical image of the imaging unit 214 are controlled by movement of the lens. The light receiving element is composed of a plurality of light receiving elements arranged two-dimensionally and regularly on a light receiving surface. The light receiving element includes, for example, photodiodes and a Bayer array of color filters, and is an imaging device such as a three-plate type charge coupled device (CCD) or a complementary metal oxide semiconductor (CMOS). The imaging unit 214 performs imaging in an imaging cycle t2 equal to the light change cycle t1 of the transmission unit 114 of the transmission apparatus 100, and requires a period (an exposure period) t3 to perform imaging once. The imaging unit 214 takes optical images (receives incident lights) with an angle of imaging view of a predetermined range based on a control signal from the control unit 202, and sequentially outputs image signals included in the angle of imaging view, to the control unit 202.

Whenever an image signal is input from the imaging unit 214, an image generating unit 232 included in the control unit 202 converts the corresponding image signal into digital data, thereby generating a frame.

A decoding unit 234 included in the control unit 202 searches frames input continuously in a time series for portions (change areas) where hue changes based on wavelength band changes occur. Specifically, the decoding unit 234 determines the lightness value of each pixel included in the image data of the frames. Further, the decoding unit 234 considers pixels having lightness values equal to or larger than a predetermined value as candidates (candidate areas) for portions (change areas) where hue changes occur due to reception of lights having wavelength bands corresponding to luminescent colors from the transmission unit 114 of the transmission apparatus 100. Furthermore, the decoding unit 234 determines the color of the same coordinates in a candidate area of each of a predetermined number of acquired latest frames. As a result of the determination, in a case where the hue value significantly changes in a predetermined pattern, like a case where the hue value of the coordinates in the candidate area is a first predetermined value in a certain frame, and is a second predetermined value in any other frame, the decoding unit 234 considers the corresponding candidate area as a change area.

In a case where there is any change area, thereafter, whenever imaging is performed, a determining unit 238 included in the decoding unit 234 acquires the hue value (the wavelength band) of each change area included in a frame, and determines the color of the change area corresponding to the acquired hue value. In a case where the color of the change area determined by the determining unit 238 is not any one of red (R), green (G), and blue (B), a color estimation unit 240 included in the decoding unit 234 estimates that the color of the change area is any one of red (R), green (G), and blue (B). The details of the processes of the determining unit 238 and the color estimation unit 240 will be described below. In a case where the determining unit 238 determines that the color of the change area is any one of red (R), green (G), and blue (B), or in a case where the color estimation unit 240 estimates that the color of the change area is any one of red (R), green (G), and blue (B), the decoding unit 234 decodes a bit data stream corresponding to the color, thereby acquiring communication object information.

The image generating unit 232 generates an image of the communication object information acquired by the decoding unit 234. A display control unit 236 included in the control unit 202 performs control such that the display unit 207 displays the image of the communication object information.

Now, operations of the optical communication system 1 will be described. In the optical communication system 1, the transmission apparatus 100 performs a transmitting process, and the reception apparatus 200 performs a receiving process.

The encoding/modulating unit 110 included in the control unit 102 of the transmission apparatus 100 encodes communication object information into a bit data stream, and performs digital modulation based on the bit data stream.

Subsequently, the driving unit 112 included in the control unit 102 performs control based on a signal generated by the encoding/modulating unit 110 such that the transmission unit 114 changes red (R), green (G), and blue (B) lights in a light emission cycle t1 over time. Therefore, under control of the driving unit 112, the transmission unit 114 outputs red (R), green (G), and blue (B) lights in the light emission cycle t1, based on the modulated communication object information. Also, in the present embodiment, the driving unit 112 performs control such that the transmission unit 114 performs lighting off for synchronization representing the head position of information for a period which is twice the change cycle t1. Therefore, the transmission unit 114 performs lighting off for synchronization for a period which is twice the change cycle t1 in a predetermined cycle while outputting red (R), green (G), and blue (B) lights in the change cycle t1.

Figure 4:
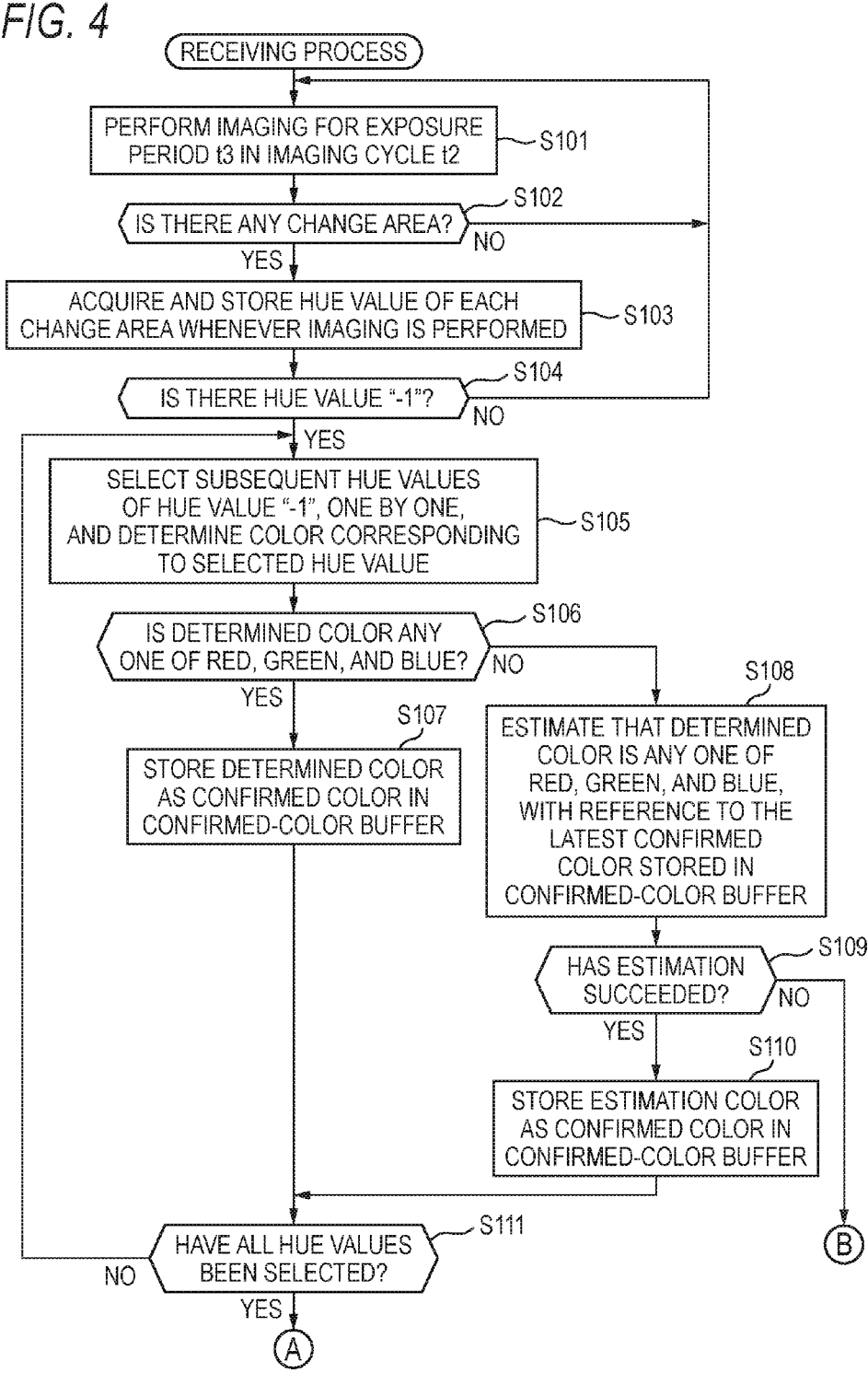
FIG. 4 is a flow chart illustrating operations of a receiving process of the reception apparatus.
Figure 5:
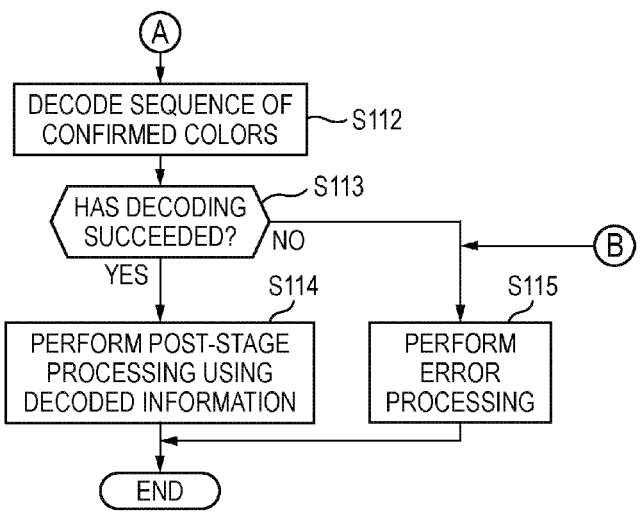
FIG. 5 is a flow chart illustrating the other operations of the receiving process of the reception apparatus.

FIGS. 4 and 5 are flow charts illustrating operations of a receiving process of the reception apparatus 200. If a user of the reception apparatus 200 recognizes that the color of light of the transmission unit 114 included in the transmission apparatus 100 varies, the user activates an application program for acquiring communication object information, and performs an operation to perform imaging. In response to the user's operation, in STEP S101, the image generating unit 232 included in the reception apparatus 200 performs imaging (light reception) on an imaging range including the transmission unit 114 of the transmission apparatus 100, for an exposure period t3, in the imaging cycle t2.

Subsequently, whenever an image signal is input from the image generating unit 232, the image generating unit 232 converts the corresponding image signal into digital data, thereby generating a frame. Further, in STEP S102, the decoding unit 234 included in the control unit 202 searches frames input continuously in time series for change areas, thereby determining whether there is any change area. In a case where there is no change area ("NO" in STEP S102), the operations from imaging which is performed in STEP S101 by the image generating unit 232 are repeated.

Meanwhile, in a case where there is any change area ("YES" in STEP S102), thereafter, whenever imaging is performed, in STEP S103, the determining unit 238 included in the decoding unit 234 acquires the hue value of each change area included in a frame, and stores the acquired hue value in the memory 204.

Figure 6:
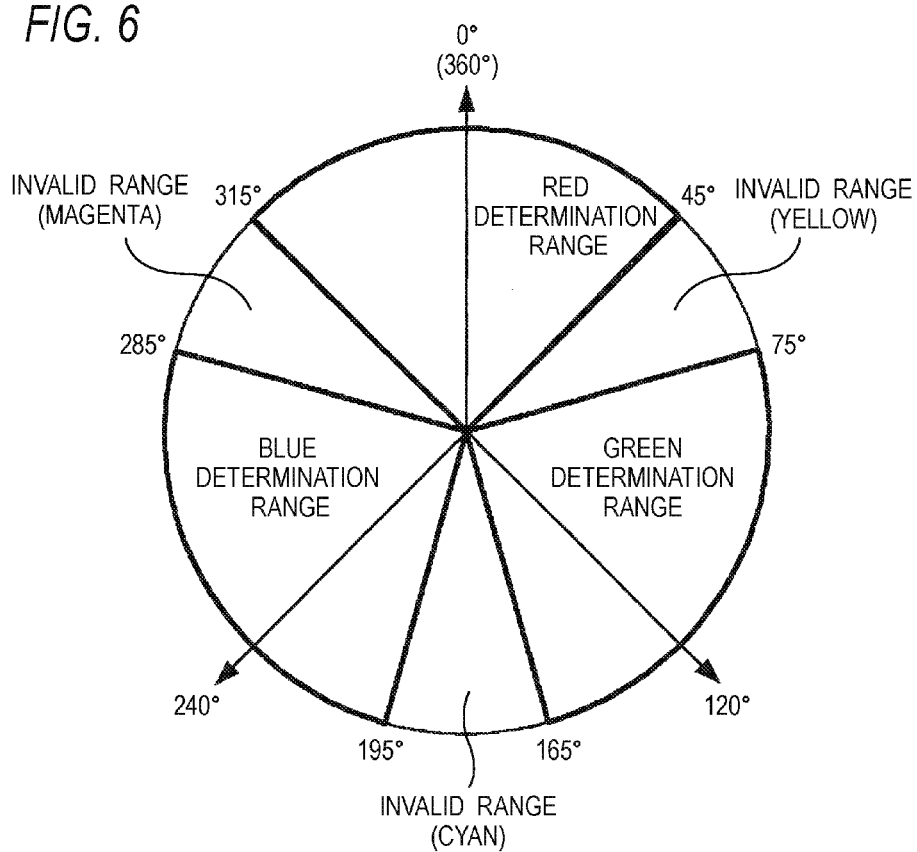
FIG. 6 is a view illustrating an example of a color determination chart based on hue values.

FIG. 6 is a view illustrating an example of a color determination chart based on hue values. As shown in FIG. 6, hue value ranges for red (R) determination (red determination ranges) are a range from 0° to 45° and a range from 315° to 360°. Also, a hue value range for green (G) determination (a green determination range) is from 75° to 165°. Further, a hue value range for blue (B) determination (a blue determination range) is from 195° to 285°.

Here, the term "color determination" means to estimate a wavelength range (a spectrum) included in a visible light range and corresponding to the color of an emitted (received) light.

In the present embodiment, the transmission unit 114 included in the transmission apparatus 100 outputs red (R), green (G), and blue (B) lights corresponding to communication object information. For this reason, hue value ranges other than the red determination ranges, the green determination range, and the blue determination range become hue value ranges (invalid ranges) unusable to directly acquire communication object information. Specifically, a hue value range from 45° to 75° (yellow (Y) to be referred to simply as yellow) interposed between one red determination range and the green determination range, a hue value range from 165° to 195° (cyan (C) to be referred to simply as cyan) interposed between the green determination range and the blue determination range, and a hue value range from 285° to 315° (magenta (M) to be referred to simply as magenta) interposed between the green determination range and the other red determination range become invalid ranges. Information corresponding to the color determination chart is stored, for example, in the memory 204.

Also, in a case where the transmission unit 114 included in the transmission apparatus 100 performs lighting off for synchronization, the determining unit 238 acquires a hue value "−1" corresponding to "black" included in the color of a change area.

Referring to FIG. 4 again, a description will be made. Subsequently, in STEP S104, the determining unit 238 determines whether there is the hue value "−1" (black) in the hue values acquired and stored in the memory 204 whenever imaging has been performed. In a case where the hue value "−1" does not exist ("NO" in STEP S104), the operations from imaging of the imaging unit 214 in STEP S101 are repeated.

Meanwhile, in a case where the hue value "−1" exists ("YES" in STEP S104), the determining unit 238 selects hue values acquired and stored after the hue value "−1" was acquired and stored (hue values after the hue value "−1"), one by one, from the oldest one. Further, in STEP S105, the determining unit 238 determines a color corresponding to the selected hue value, with reference to the color determination chart shown in FIG. 6. Specifically, if the hue value belongs to the range from 0° to 45° or the range from 315° to 360°, the determining unit 238 determines that the color is red, and if the hue value belongs to the range from 75° to 165°, the determining unit determines that the color is green, and if the hue value belongs to the range from 195° to 285°, the determining unit determines that the color is blue. Also, if the hue value belongs to the range from 45° to 75°, the determining unit 238 determines that the color is yellow, and if the hue value belongs to the range from 165° to 195°, the determining unit determines that the color is cyan, and if the hue value belongs to the range from 285° to 315°, the determining unit determines that the color is magenta.

Subsequently, in STEP S106, the determining unit 238 determines whether the color determined in STEP S105 is any one of red (R), green (G), and blue (B), or not. In a case where the determined color is any one of red (R), green (G), and blue (B) ("YES" in STEP S106), in STEP S107, the determining unit 238 stores information on the determined color as confirmed-color information in a confirmed-color buffer configured in the memory 204.

Meanwhile, in a case where the determined color is not any one of red (R), green (G), and blue (B) ("NO" in STEP S106), in STEP S108, with reference to the latest confirmed color (previous confirmed color) information of confirmed-color information stored in the confirmed-color buffer, the color estimation unit 240 included in the decoding unit 234 estimates that the color corresponding to the hue value selected in STEP S105 is any one of red (R), green (G), and blue (B).

Figure 7:
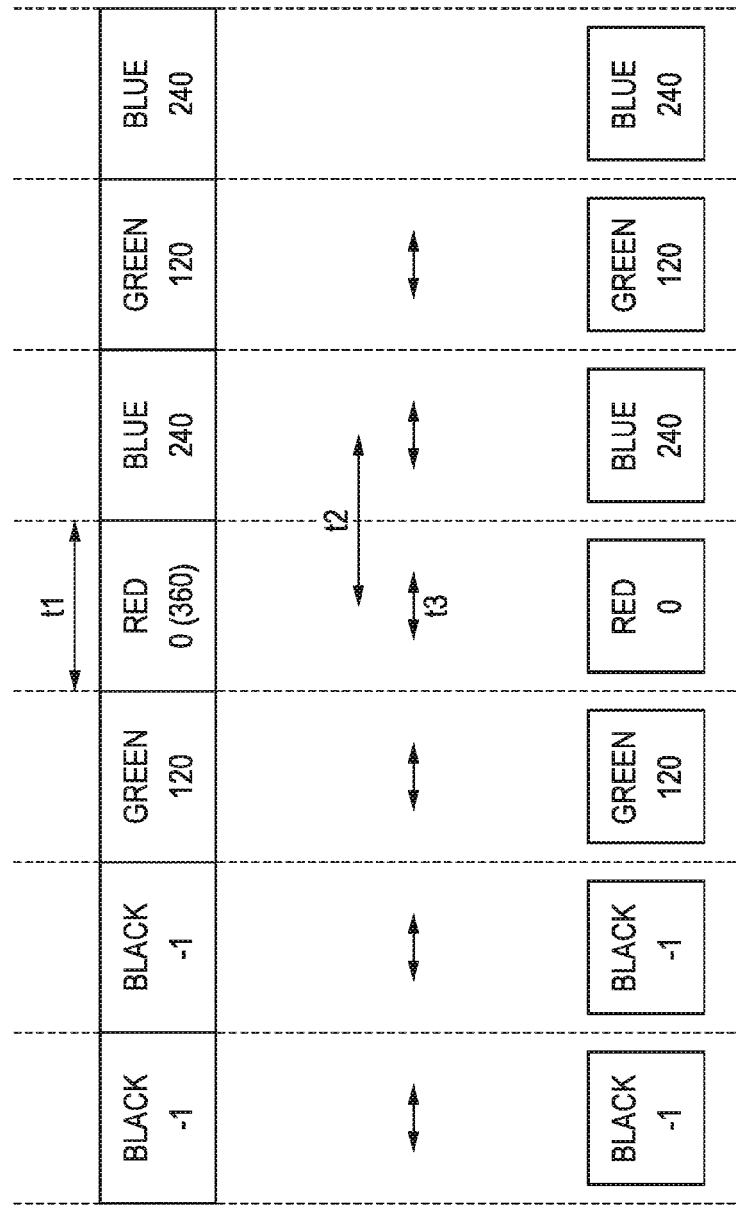
FIGS. 7A, 7B and 7C are views illustrating examples of color determination.
Figure 8:
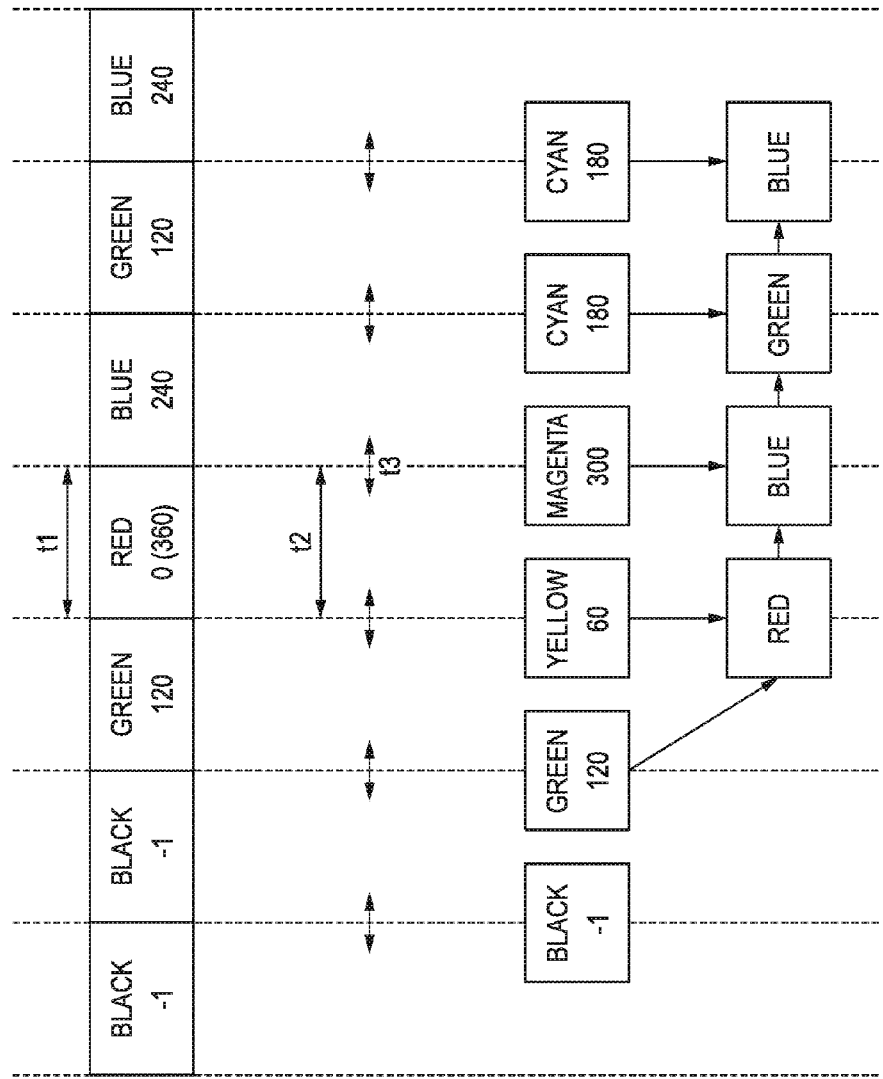
FIGS. 8A, 8B, 8C and 8D are views illustrating examples of color determination and color estimation.

FIG. 7 is a view illustrating examples of color determination, and FIG. 8 is a view illustrating examples of color determination and color estimation.

In the case of FIGS. 7A through 7C, an exposure period t3 of the imaging unit 214 of the reception apparatus 200 shown in FIG. 7B is within a light emission period (the change cycle) t1 shown in FIG. 7A in which the transmission unit 114 of the transmission apparatus 100 emits a light of one color (any one of red (R), green (G), and blue (B)). In this case, in STEP S105, the determining unit 238 determines that a color corresponding to a hue value selected at that time (the current determined color) is any one of red (R), green (G), and blue (B) as shown in FIG. 7C.

Meanwhile, in the case of FIGS. 8A through 8D, an exposure period t3 of the imaging unit 214 of the reception apparatus 200 shown in FIG. 8B is across a timing shown in FIG. 8A when the transmission unit 114 of the transmission apparatus 100 changes one color (any one of red (R), green (G), and blue (B)) to another color. In this case, since a mixed color of any two colors of red (R), green (G), and blue (B) can be determined at a certain light reception timing, in STEP S105, the determining unit 238 determines that a color corresponding to a hue value selected at that time (a current determined color) is any one of yellow, cyan, and magenta other than red (R), green (G), and blue (B) as shown in FIG. 8C. For this reason, in STEP S108, a process of estimating that the color is any one of red (R), green (G), and blue (B) is performed.

Also, in a case where an exposure period t3 of the imaging unit 214 is across a timing when black corresponding to lighting off of the transmission unit 114 of the transmission apparatus 100 changes to any one of red (R), green (G), and blue (B), since the lightness value decreases, the determining unit 238 can determine that a color corresponding to a hue value selected at that time (a current determined color) is any one of red (R), green (G), and blue (B) as shown in FIG. 8C. For this reason, the process of STEP S108 is not performed.

In the color estimation of STEP S108, the following processes are performed. If the color determination chart of FIG. 6 is referred to, yellow is a mixed color of red (R) and green (G). In other words, in a case where the current determined color of STEP S105 is yellow, in STEP S108, if the previous confirmed color was red (R), the color estimation unit 240 can estimate that the color corresponding to the hue value selected at that time (the estimation color) is green (G), and if the previous confirmed color was green (G), the color estimation unit can estimate that the color corresponding to the hue value selected at that time (the estimation color) is red (R).

Also, if the color determination chart of FIG. 6 is referred to, cyan is a mixed color of green (G) and blue (B). In other words, in a case where the current determined color of STEP S105 is cyan, in STEP S108, if the previous confirmed color was green (G), the color estimation unit 240 can estimate that the color corresponding to the hue value selected at that time (the estimation color) is blue (B), and if the previous confirmed color was blue (B), the color estimation unit can estimate that the color corresponding to the hue value selected at that time (the estimation color) is green (G).

Also, if the color determination chart of FIG. 6 is referred to, magenta is a mixed color of blue (B) and red (R). In other words, in a case where the current determined color of STEP S105 is magenta, in STEP S108, if the previous confirmed color was blue (B), the color estimation unit 240 can estimate that the color corresponding to the hue value selected at that time (the estimation color) is red (R), and if the previous confirmed color was red (R), the color estimation unit can estimate that the color corresponding to the hue value selected at that time (the estimation color) is blue (B).

FIG. 9 is a view illustrating an example of a color estimation table which can be used in STEP S108 to perform color estimation based on the current determined color and the previous confirmed color. As shown in FIG. 9, in a case where the current determined color is yellow, if the previous confirmed color was red (R), the estimation color is green (G) which can be mixed with red (R) to create yellow, and if the previous confirmed color was green (G), the estimation color is red (R) which can be mixed with green (G) to create yellow. Meanwhile, in a case where the previous confirmed color is blue (B), if the color determination chart of FIG. 6 is referred to, not only in a case of mixing blue (B) with red (R) but also in a case of mixing blue (B) with green (G), yellow is not created. For this reason, estimation is impossible.

Also, in a case where the current determined color is magenta, if the previous confirmed color was red (R), the estimation color is blue (B) which can be mixed with red (R) to create magenta, and if the previous confirmed color was blue (B), the estimation color is red (R) which can be mixed with blue (B) to create magenta. Meanwhile, in a case where the previous confirmed color is green (G), if the color determination chart of FIG. 6 is referred to, not only in a case of mixing green (G) with red (R) but also in a case of mixing green (G) with green (G), magenta is not created. For this reason, estimation is impossible.

Also, in a case where the current determined color is cyan, if the previous confirmed color was green (G), the estimation color is blue (B) which can be mixed with green (G) to create cyan, and if the previous confirmed color was blue (B), the estimation color is green (G) which can be mixed with blue (B) to create cyan. Meanwhile, in a case where the previous confirmed color is red (R), if the color determination chart of FIG. 6 is referred to, not only in a case of mixing red (R) with green (G) but also in a case of mixing red (R) with blue (B), cyan is not created. For this reason, estimation is impossible.

Also, in a case where the previous confirmed color was not any one of red (R), green (G), and blue (B), even if the current determined color is any one of yellow, magenta, and cyan, estimation is impossible.

Information on the color estimation table shown in FIG. 9 is retained in the memory 204. In STEP S108, with reference to the color estimation table, the color estimation unit 240 performs color estimation based on the previous confirmed color and the current determined color.

Referring to FIG. 4 again, a description will be made. After STEP S108, in STEP S109, the color estimation unit 240 determines whether color estimation has succeeded, specifically, whether it has been possible to estimate that the color is any one of red (R), green (G), and blue (B). In a case of determining that color estimation has succeeded ("YES" in STEP S109), in STEP S110, the color estimation unit 240 stores information on the estimation color of STEP S108 as confirmed-color information in the confirmed-color buffer configured in the memory 204.

After STEP S107 or STEP S110, the determining unit 238 determines whether all of the hue values acquired and stored after the hue value "−1" was acquired and stored (the hue values after the hue value "−1") have been selected. In a case where all have not been selected ("NO" in STEP S111), the operations from STEP S105 of selecting a hue value and determining a color corresponding to the selected hue value are repeated.

Meanwhile, in a case where all have been selected ("YES" in STEP S111), the receiving process proceeds to the operations of FIG. 5, and in STEP S112, the decoding unit 234 decodes the bit data stream representing the sequence of confirmed colors stored in the confirmed-color buffer into the communication object information.

Subsequently, in STEP S113, the decoding unit 234 determines whether the decoding of STEP S112 has succeeded. In a case of determining that the decoding has succeeded ("YES" in STEP S113), in STEP S114, the control unit 202 performs post-stage processing (such as communication object information display control) using the decoded communication object information.

Meanwhile, in a case of determining that the decoding has failed ("NO" in STEP S113), in STEP S115, the control unit 202 performs processing related to decoding errors. Also, even in a case where it is determined in STEP S109 of FIG. 4 that the color estimation has failed ("NO" in STEP S109), in STEP S115, the control unit 202 performs processing related to decoding errors.

As described above, in the optical communication system 1 according to the present embodiment, the transmission unit 114 included in the transmission apparatus 100 outputs while changing red (R), green (G), and blue (B) lights corresponding to communication object information, in the light emission cycle t1.

Meanwhile, the imaging unit 214 included in the reception apparatus 200 performs imaging for an exposure period t3, in the imaging cycle t2 equal to the light change cycle t1 of the transmission unit 114 included in the transmission apparatus 100. Further, whenever imaging is performed, the determining unit 238 included in the decoding unit 234 of the control unit 202 acquires the hue value of each change area included in a frame, and determines the color of the change area corresponding to the acquired hue value. Furthermore, in a case where the color of the change area determined by the determining unit 238 is not any one of red (R), green (G), and blue (B), the color estimation unit 240 included in the decoding unit 234 estimates that the color of the change area is any one of red (R), green (G), and blue (B), based on the correspondence relation between the current determined color and the previous confirmed color.

As described above, even in a case where the current determined color is not any one of red (R), green (G), and blue (B), the process of estimating that it is any one of those colors is performed. Therefore, even in a case where an exposure period t3 which comes in the imaging cycle t2 of the imaging unit 214 of the reception apparatus 200 as shown in FIG. 8 is across a timing when the transmission unit 114 of the transmission apparatus 100 changes one color (any one of red (R), green (G), and blue (B)) to another color, in other words, in a case where the light emission periods of the transmission apparatus 100 is not in sync with the imaging cycles of the reception apparatus 200, due to color estimation, the reception apparatus 200 can confirm that the color of a change area is any one of red (R), green (G), and blue (B).

Second Embodiment

Now, an optical communication system according to a second embodiment of the present invention will be described. The present embodiment has the same configuration as that of the optical communication system 1 according to the first embodiment, and thus a description thereof will not be made.

Figure 10:
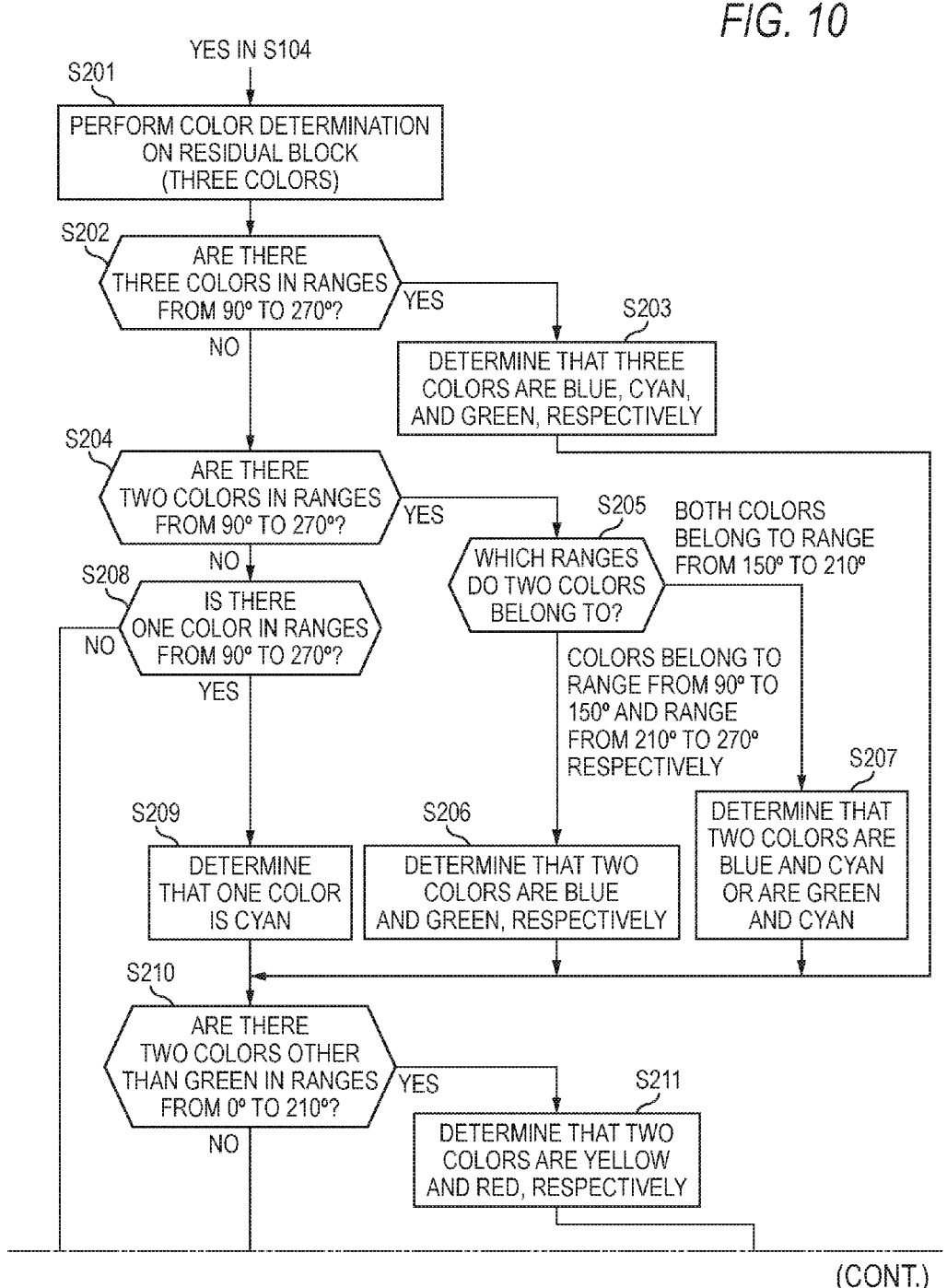
FIG. 10 is a flow chart illustrating operations of a receiving process of a reception apparatus according to a second embodiment.

FIG. 10 is a flow chart illustrating operations of a receiving process of the reception apparatus 200, and processes to STEP S104 and a color determining process using a hue value are identical to those of the first embodiment. In other words, in the second embodiment, colors of signals are not determined one by one, but are determined in units of a signal group (this signal group includes three colors at most) is a minimum unit decodable into significant information. First, in STEP S201, the determining unit 238 of the reception apparatus 200 acquires signal groups each of which composed of three signals including the hue value "−1" corresponding to "black" included in the color of a change area, in units of one block.

Subsequently, in STEP S202, the determining unit determines whether all colors included in each signal group exist in all of the hue value ranges from 90° to 270° corresponding to the wavelength bands of green, cyan, and blue.

In a case where it is determined in STEP S202 that all of the three colors exist ("YES" in STEP S202), in STEP S203, the determining unit determines that the colors of those signals are blue, cyan, and green, respectively, and proceeds to STEP S210. Meanwhile, in a case where it is determined in STEP S202 that any of the three colors does not exist ("NO" in STEP S202), in STEP S204, the determining unit determines whether two colors exist. In a case of determining that two colors exist ("YES" in STEP S204), in STEP S205, the determining unit determines hue value ranges where the two colors exist. In a case of determining that the two colors exist in a hue value range from 90° to 150° and a hue value range from 210° to 270°, respectively ("COLORS BELONG TO RANGE FROM 90° TO 150° AND RANGE FROM 210° TO 270° RESPECTIVELY" in STEP S205), in STEP S206, the determining unit determines that the two colors are blue and green, respectively. Meanwhile, if it is determined that both of the two colors exist in a hue value range from 150° to 210° ("BOTH COLORS BELONG TO RANGE FROM 150° TO 210°"' in STEP S205), in STEP S207, the determining unit determines that cyan is included as any one of the two colors, and consequently determines that the two colors are blue and cyan, or are green and cyan.

Meanwhile, in a case where it is determined in STEP S204 that two colors do not exist ("NO" in STEP S204), in STEP S208, the determining unit determines whether only one color exists. In a case of determining that only one color exists ("YES" in STEP S208), in STEP S209, the determining unit estimates that the one color is cyan corresponding to an intermediate value of the hue value range thereof. Meanwhile, in a case where there is not any color ("NO" in STEP S208), the determining unit determines an error, and proceeds to STEP S115 of FIG. 5. If the determining process on the hue value ranges from 90° to 270° (corresponding to green, cyan, and blue) finishes, subsequently, in STEP S210, the determining unit determines that all of the colors of the signals exist in all of the hue value ranges from 0° to 210° corresponding to the wavelength bands of red, yellow, green, and cyan.

Also, although the above described hue value ranges includes cyan, since the above described determining process has already finished with respect to the range of cyan, substantially, determination on three colors of red, yellow, and green is performed. Also, in this process, since existence or non-existence of each of blue, cyan, and green has been already determined, whether red and yellow are included is determined. Therefore, in STEP S210, the determining unit determines whether two colors other than green are included in the ranges from 0° to 210°. In a case where it is determined in STEP S210 that two colors other than green exist in the ranges from 0° to 210° ("YES" in STEP S210), the determining unit determines that the colors of the signals are yellow and red, respectively, in STEP S211, and then proceeds to STEP S216. Meanwhile, in a case where it is determined in STEP S210 that two colors do not exist ("NO" in STEP S210), in STEP S212, the determining unit determines whether one color exists. If it is determined that one color exists ("YES" in STEP S212), in STEP S213, the determining unit determines what the one color is. In a case where there is not any color ("NO" in STEP S212), the determining unit determines an error, and proceeds to STEP S115 of FIG. 5.

In a case where it is determined in STEP S213 that the one color is red ("RED" in STEP S213), in STEP S214, the determining unit determines that the one color is red. Meanwhile, in a case where it is determined in STEP S213 that the one color is red ("YELLOW" in STEP S213), in STEP S215, the determining unit determines that the one color is yellow. If the determining process on the hue value ranges from 0° to 210° (red, yellow, blue, and cyan) finishes, subsequently, in STEP S216, the determining unit determines whether the colors of the signals exist in all of the hue value ranges from 210° to 359° corresponding to the wavelength bands of blue, magenta, and red. However, since the process on existence or non-existence of blue or red has finished, in the determining process of STEP S216, substantially, whether a color other than blue and red, that is, magenta exists is determined. Then, in a case where it is determined that a color other than blue and red exists ("YES" in STEP S216), in STEP S217, the determining unit determines that the existing color is magenta. Meanwhile, in a case where any color other than blue and red does not exist ("NO" in STEP S216), the determining unit determines that there is no color to be determined, and proceeds to STEP S115 of FIG. 5. As described above, it is determined whether each color of red, green, blue, yellow, cyan, and magenta exists in the colors of the signal group, and in a case where red, green, and blue exist, the receiving process proceeds to STEP S112, and in a case where yellow, cyan, or magenta exists, the receiving process proceeds to the process of STEP S108.

As described above, in the second embodiment, existence or non-existence determination is first performed on cyan, and then is performed in the order of yellow and magenta. This is because a color (a wavelength band) on which determination becomes difficult if the brightness of light which is emitted from the transmission apparatus 100 approaches a saturation state is prioritized, and can be said as the determining process on a color corresponding to a short wavelength band is preferentially performed. Also, in a case where it is not required to consider difficulty of color determination in the saturation state, unlike the above described case, determining processes on cyan, yellow, and magenta may be performed in parallel at the same time.

Also, in the related art, in a case where the light emission periods of the transmission apparatus 100 are not in sync with the imaging cycles of the reception apparatus 200, as shown in FIGS. 11A through 11C, a light change cycle (t1×2) of transmission apparatus 100 shown in FIG. 11A is set to twice an imaging cycle t of the imaging unit 214 of the reception apparatus 200 shown in FIG. 11B. Further, in a case where an exposure period t3 is across a timing when the transmission unit 114 of the transmission apparatus 100 changes one color (any one of red (R), green (G), and blue (B)) to another color, a color corresponding to the exposure period t3 being across the change timing is considered as being indeterminate, and only color determination corresponding to the other exposure periods t3 is performed, whereby communication object information can be acquired. For this reason, an increase in the communication speed is restricted.

Meanwhile, in the present embodiment, since the light change cycle t1 of one color (any one of red (R), green (G), and blue (B)) of the transmission unit 114 of the transmission apparatus 100 is the same as an imaging cycle t2 of the imaging unit 214 of the reception apparatus 200, as described above, even if an exposure period t3 is across a timing when the transmission unit 114 of the transmission apparatus 100 changes one color (any one of red (R), green (G), and blue (B)) to another color, color estimation corresponding to the exposure period t3 being across the change timing is possible. Therefore, it is possible to increase the communication speed.

Also, the present invention is not limited to the embodiments described above, and various modifications and applications are possible. For example, although a case of using red (R), green (G), and blue (B) lights which are visible lights in communication has been described in the embodiments, visible lights of other colors may be used, and lights other than visible lights, such as infrared lights, may be used.

Also, the transmission unit 114 included in the transmission apparatus 100 may be configured as a part of the display unit.

Also, the reception apparatus 200 may be any other communication apparatus as long as it can perform imaging and communication. For example, the reception apparatus may be a personal handy-phone system (PHS), a personal digital assistance or a personal data assistance (PDA), a tablet personal computer (PC), a game machine, a portable music reproduction apparatus, or the like.

Also, an apparatus having both of the function of the reception apparatus 200 and the function of the transmission apparatus 100 may be prepared such that both functions can be properly used according to places.

Also, in each embodiment described above, a system for performing the above described processes may be configured by storing executable programs in computer-readable recording media such as a flexible disc, a compact disc read-only memory (CD-ROM), a digital versatile disc (DVD), and a magneto-optical disc (MO) to be distributed and installing those programs.

Also, those programs may be stored in a disc device or the like included in a predetermined server on a network NW such as the Internet, and be downloaded, for example, by superposing the programs on carrier waves.

Also, in some cases such as a case where operating systems (OSs) share and implement the above described functions or a case where an OS and applications implement the above described functions in cooperation with one another, only the other part other than the OSs may be stored in media to be distributed, or may be downloaded.

Although the preferred embodiments of the present invention have been described above, the present invention is not limited to those specific embodiments, and inventions which are described in claims and equivalents thereof are included in the present invention.

What is claimed is:

1. An optical communication apparatus comprising:
a sensor that receives light which changes among a plurality of predetermined wavelength bands in a predetermined change cycle to communicate object information by optical transmission, the sensor receiving the light in each of a plurality of light reception periods of a predetermined imaging cycle; and
a processor which is configured to:
determine, for a first wavelength band of the light received by the sensor in a first light reception period from among the plurality of light reception periods, whether the first wavelength band belongs to one of predetermined colors; and
estimate, by referring to a color of a second wavelength band of the light which was received by the sensor in a second light reception period preceding the first light reception period, which one of the predetermined colors the first wavelength band should be allocated to, in a case in which it is determined that the first wavelength band does not belong to one of the predetermined colors.

2. The optical communication apparatus according to claim 1, wherein:
the processor estimates which one of the predetermined colors the first wavelength band should be allocated to, based on a relation between the first wavelength band and the second wavelength band; and
the second wavelength band is a wavelength band that was determined by the processor to belong to one of the predetermined colors or estimated by the processor to be allocated to one of the predetermined colors, in the second light reception period.

3. The optical communication apparatus according to claim 2, wherein:
the processor estimates which one of the predetermined colors the first wavelength band should be allocated to, in a case in which the processor determines that the first wavelength band is between the second wavelength band and a third wavelength band; and
the third wavelength band is a wavelength band to which one of the predetermined colors belongs.

4. The optical communication apparatus according to claim 2, wherein:
the processor estimates which one of the predetermined colors the first wavelength band should be allocated to, for each wavelength band of the light received by the sensor in consecutive ones of the light reception periods of the predetermined imaging cycle.

5. A wavelength band estimating apparatus comprising:
a memory; and
a processor which executes a program stored in the memory to perform functions comprising:
determining, for a first wavelength band of light received in a first light reception period from among a plurality of light reception periods of a predetermined cycle, whether the first wavelength band belongs to one of predetermined colors; and
estimating, by referring to a color of a second wavelength band of light which was received in a second light reception period preceding the first light reception period, which one of the predetermined colors the first wavelength band should be allocated to, in a case in which it is determined that the first wavelength band does not belong to one of the predetermined colors.

6. The wavelength band estimating apparatus according to claim 5, wherein:
the processor estimates which one of the predetermined colors the first wavelength band should be allocated to, based on a relation between the first wavelength band and the second wavelength band; and
the second wavelength band is a wavelength band that was determined by the processor to belong to one of the predetermined colors or estimated by the processor to be allocated to one of the predetermined colors, in the second light reception period.

7. The wavelength band estimating apparatus according to claim 6, wherein:
the processor estimates which one of the predetermined colors the first wavelength band should be allocated to, in a case in which the processor determines that the first wavelength band is between the second wavelength band and a third wavelength band; and
the third wavelength band is a wavelength band to which one of the predetermined colors belongs.

8. The wavelength band estimating apparatus according to claim 6, wherein:
the processor estimates which one of the predetermined colors the first wavelength band should be allocated to, for each wavelength band of the light received in consecutive ones of the light reception periods of the predetermined cycle.

9. An optical communication method comprising:
receiving light which changes among a plurality of predetermined wavelength bands in a predetermined change cycle to communicate object information by optical transmission, the light being received in each of a plurality of light reception periods of a predetermined cycle;
determining, for a first wavelength band of the light received in a first light reception period from among the plurality of light reception periods, whether the first wavelength band belongs to one of predetermined colors; and
estimating, by referring to a color of a second wavelength band of the light received in a second light reception period preceding the first light reception period, which one of the predetermined colors the first wavelength band should be allocated to, in a case in which it is determined that the first wavelength band does not belong to one of the predetermined colors.

10. The optical communication method according to claim 9, wherein:
the estimating estimates which one of the predetermined colors the first wavelength band should be allocated to, based on a relation between the first wavelength band and the second wavelength band; and
the second wavelength band is a wavelength band that was determined to belong to one of the predetermined colors or estimated to be allocated to one of the predetermined colors, in the second light reception period.

11. The optical communication method according to claim 10, wherein:
the estimating estimates which one of the predetermined colors the first wavelength band should be allocated to, in a case in which the first wavelength band is between the second wavelength band and a third wavelength band; and the third wavelength band is a wavelength band to which one of the predetermined colors belongs.

12. The optical communication method according to claim 10, wherein:

the estimating estimates which one of the predetermined colors the first wavelength band should be allocated to, for each wavelength band of the light received in consecutive ones of the light reception periods of the predetermined cycle.

13. A non-transitory computer-readable storage medium having a program stored thereon, the program being executable by a processor to control the processor to perform functions comprising:

receiving light which changes among a plurality of predetermined wavelength bands in a predetermined change cycle to communicate object information by optical transmission, the light being received in each of a plurality of light reception periods of a predetermined cycle;

determining, for a first wavelength band of the light received in a first light reception period from among the plurality of light reception periods, whether the first wavelength band belongs to one of predetermined colors; and estimating, by referring to a color of a second wavelength band of the light received in a second light reception period preceding the first light reception period, which one of the predetermined colors the first wavelength band should be allocated to, in a case in which it is determined that the first wavelength band does not belong to one of the predetermined colors.

14. The storage medium according to claim 13, wherein:

the estimating estimates which one of the predetermined colors the first wavelength band should be allocated to, based on a relation between the first wavelength band and the second wavelength band; and the second wavelength band is a wavelength band that was determined to belong to one of the predetermined colors or estimated to be allocated to one of the predetermined colors, in the second light reception period.

15. The storage medium according to claim 14, wherein:

the estimating estimates which one of the predetermined colors the first wavelength band should be allocated to, in a case in which the first wavelength band is between the second wavelength band and a third wavelength band; and the third wavelength band is a wavelength band to which one of the predetermined colors belongs.

16. The storage medium according to claim 14, wherein:

the estimating estimates which one of the predetermined colors the first wavelength band should be allocated to, for each wavelength band of light received in consecutive ones of the light reception periods of the predetermined cycle.

* * * * *